FIG.1

March 14, 1967 W. R. RABSON ETAL 3,309,657
DUAL CHANNEL WELL LOGGING SYSTEM
Filed April 19, 1965 2 Sheets-Sheet 2

INVENTORS
WILLIAM R. RABSON,
THOMAS A. RABSON,
HOMER M. WILSON and
BY LEROY C. DeLaTORRE Mason, Kolehmainen, Rathburn and Wyss
ATTORNEYS

3,309,657
DUAL CHANNEL WELL LOGGING SYSTEM
William R. Rabson, Thomas A. Rabson, Homer M. Wilson, and Leroy C. De La Torre, Houston, Tex., assignors, by mesne assignments, to PGAC Development Company, Houston, Tex., a corporation of Texas
Filed Apr. 19, 1965, Ser. No. 449,210
16 Claims. (Cl. 340—18)

The present invention relates to well logging systems, and, more particularly, to well logging systems of the simultaneous or dual channel type which are arranged to provide logs of two different parameters or characteristics of the bore hole at the same time.

While simultaneous or dual channel logging systems have been proposed heretofore, considerable difficulty has been experienced in obtaining a satisfactory arrangement when pulse type signals are transmitted over the supporting cable from the subsurface unit to the surface equipment. This particularly is true in those systems in which both pulse type signals are transmitted over the same conductor of the cable to the earth's surface.

In such systems the pulses from one channel are applied to the cable conductor with one polarity and pulses from the other channel are applied to this conductor with the opposite polarity. However, overshoot portions of the original pulse, which are of the opposite polarity, are many times falsely interpreted as a pulse from the other channel, thus giving an erroneous indication of the magnitude of the measured variable.

It is, therefore, an object of the present invention to provide a new and improved dual channel logging system wherein the pulses in one channel are maintained separate and distinct from the pulses in the other channel.

It is a further object of the present invention to provide a new and improved dual channel logging system wherein pulses from both channels may be transmitted over the same conductor while providing an arrangement whereby pulses in one channel may be readily separated from pulses in the other channel.

It is a still further object of the present invention to provide a new and improved dual channel logging system wherein pulses from both channels may be transmitted over the same conductor while providing an arrangement whereby pulses in one channel may be readily separated from pulses in the other channel even though the pulses in both channels are of relatively small amplitude.

It is another object of the present invention to provide a new and improved dual channel logging system wherein pulses of one polarity corresponding to one logging channel may be applied to the same conductor with pulses of the opposite polarity corresponding to the other logging channel and may be readily separated therefrom at the earth's surface without causing an erroneous count in either channel.

It is still another object of the present invention to provide a new and improved dual channel logging system wherein oppositely polarized pulses are employed to represent the measuring level in the respective channels and means are provided for substantially eliminating any overshoot portions of the oppositely polarized pulses prior to separation of the pulses so that interference between channels is positively avoided.

Briefly, the foregoing and other objects of the invention are achieved by purposely generating the pulses in the subsurface unit so that each pulse from one channel comprises a composite pulse having a first portion of one polarity immediately followed by a second portion of opposite polarity, these first and second portions having substantially the same area. The pulses from the other channel are converted to composite pulses each of which has a first portion of said opposite polarity immediately followed by a second portion of said one polarity and again said first and second portions have substantially the same area. With this arrangement the first pulse portions of one channel are of the same polarity as the second pulse portions of the other channel. Similarly the second pulse portions of one chanel are of the same polarity as the first pulse portions of the other channel.

These composite pulses are transmitted to the earth's surface over a common conductor and are applied to a common fast-acting integrator circuit. This integrator circuit is arranged to integrate each composite pulse and since the first and second portions of each composite pulse are of approximately equal area, the output of the integrator circuit consists of first large amplitude pulses of one polarity corresponding to one channel and without any substantial overshoot portions of the opposite polarity and second large amplitude pulses of the opposite polarity corresponding to the other channel and also without any substantial overshoot portions. These oppositely polarized pulses may then be readily applied to suitable detection circuits without any appreciable interference from the opposite channel since no overshoot portions are present.

In accordance with a further feature of the invention, facilities are provided at the earth's surface for obtaining an exact balance between channels and for suppressing even small overshoot portions so that pulses having relatively small amplitude may be separated and applied to the respective detection circuits.

The invention, both as to its organization and method of operation, together with further objects and advantages thereof, will best be understood by reference to the following specification taken in connection with the accompanying drawings in which.

Figure 1:
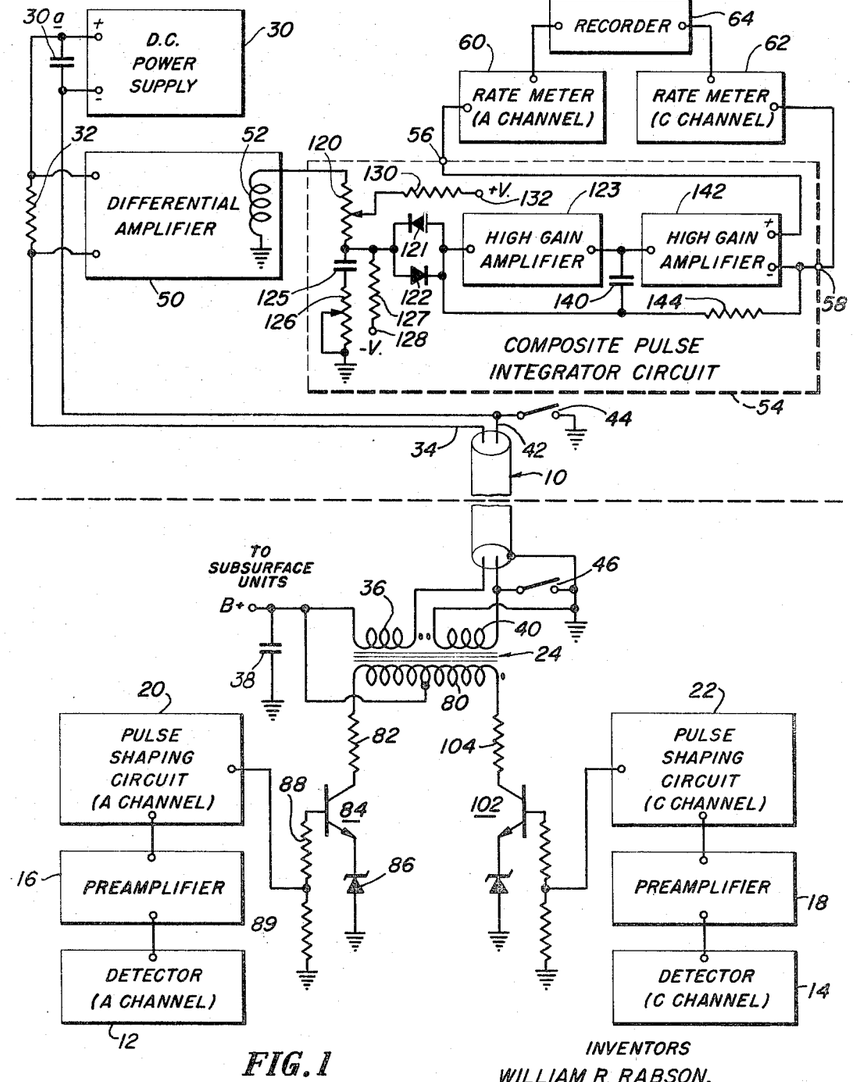
FIG. 1 is a schematic diagram, partly in block diagram form, of a dual channel logging system embodying the principles of the present invention.

Referring now to the drawings and more particularly to FIG. 1, the present invention is therein illustrated as comprising a subsurface unit (shown below the horizontal dotted line) which is connected to a cable indicated at 10 so that the subsurface unit may be lowered into a bore hole for measuring purposes by suitable apparatus, as will be readily understood by those skilled in the art. The conductors 34 and 42 of the cable 10 are arranged to be connected to surface equipment shown generally above the horizontal dotted line in FIG. 1.

While the dual channel logging system of the present invention is of general application and may be employed in either acoustic or radiation well logging systems, it will be illustrated in conjunction with a radiation logging system in which detectors 12 and 14 in the A channel and C channel, respectively, of the subsurface unit are detectors of the pulse producing type. It will be understood that the detectors 12 and 14 may comprise transducers, of either the receiving or transmitting type, when the present invention is applied to an acoustic logging system.

The outputs of the detectors 12 and 14 may be supplied to suitable preamplifiers 16 and 18 the output of which is connected to the pulse shaping circuits 20 and 22. The outputs of the circuits 20 and 22 are coupled to the cable 10 by circuitry including an output transformer indicated generally at 24 so that pulse signals which have been suitably shaped in the circuits 20 and 22, and in the circuitry associated with the transformer 24 as described in more detail hereinafter, are applied to the cable 10 for transmission to the surface equipment.

Power for the circuitry in the subsurface unit is supplied from the earth's surface by means of a direct current power supply 30 which is preferably regulated so as to supply a constant current to the subsurface unit. More particularly, the current provided by the power supply 30 flows through a small series resistor 32, across which the signals from the subsurface unit are developed as will be described in more detail hereinafter, over the conductor 34 of the cable 10, through the winding 36 of the transformer 24 to a filter capacitor 38 across which the voltage for the subsurface unit is developed. The other side of the capacitor 38 is connected to ground and return current to the power supply 30 flows from ground through the other secondary winding 40 of the transformer 24, the other conductor 42 of the cable 10 back to the power supply 30.

The dual logging system of the present invention is arranged to utilize either a multiple conductor cable or a single conductor cable for the logging operation. In FIG. 1 the cable 10 is shown as utilizing the two conductors 34 and 42. However, if a single conductor cable is employed, a switch 44 is provided at the earth's surface which connects the conductor 42 to ground, it being understood that when a single conductor cable is used, the conductor 42 constitutes the grounded outer sheath of the single conductor cable. Also, a switch 46 is provided in the subsurface unit which is closed for single conductor cable operation and connects the bottom end of the conductor 42 to ground. In addition, the winding 40 is removed entirely from the circuit, so that only the output appearing across the winding 36 is transmitted to the earth's surface.

Referring now to the surface equipment of the logging system of the present invention, the signal pulses developed in the subsurface unit and applied through the windings 36 and 40 to the conductors 34 and 42 are produced across the series resistor 32, and these signals are applied to a differential amplifier indicated in block diagram form at 50. In this connection it will be understood that for these high frequency pulses the capacitor 38 and the capacitor 30a across the output terminals of the supply 30 are effectively short circuits so that the signal pulses are reproduced across the resistor 32 even though the resistor is connected in series with the conductor 34.

The differential amplifier 50 is provided with a single-ended output circuit indicated schematically by the winding 52 which is connected to a composite pulse integrator circuit 54, to be described in more detail hereinafter, wherein the composite pulses representing the A and C channels are converted in a highly efficient manner to large amplitude pulses having no appreciable overshoot portions, the large amplitude pulses of one polarity corresponding to the A channel detector pulses and the large amplitude pulses of the opposite polarity corresponding to the C channel detector pulses. The integrator circuit 54 is provided with a first output terminal 56 at which the large amplitude A channel pulses appear as positive pulses and the still unseparated large amplitude C channel pulses appear as negative pulses and a second output terminal 58 at which the large amplitude C channel pulses appear as positive pulses and the unseparated A channel pulses as negative pulses. The terminal 56 is connected to an A channel rate meter circuit 60 and the terminal 58 is connected to a C channel rate meter circuit 62. Each of the circuits 60 and 62 includes facilities for selecting only positive pulses and rejecting negative pulses so that only the large amplitude positive A channel pulses are selected in the circuit 60 and only the large amplitude positive C channel pulses are selected in the circuit 62. Such pulse selection may be accomplished by any suitable pulse height selection circuit, such as a flip-flop circuit provided with a variable triggering level, as will be readily understood by those skilled in the art. The selected pulses are then converted in each of the circuits 60 and 62 to a substantial unidirectional voltage having an amplitude which is proportional to the rate of occurrence of the applied pulses in any suitable form of rate meter circuit. These unidirectional output signals are applied to two inputs of a dual channel recorder indicated generally at 64. In an acoustic logging system the two outputs of the circuit 54 are supplied to suitable pulse height selection circuits the outputs of which are supplied to conventional detection or interval measuring equipment for the two channels of the logging systems. In this connection it will be understood that any suitable arrangement may be employed for measuring the depth of the subsurface unit as it is moved within the bore hole and providing a suitable signal which may be recorded with the dual channel logging information.

Considering now the circuit arrangement of the component portions of the subsurface unit described generally above, in the illustrated radiation logging system, the detectors 12 and 14 may comprise any suitable radiation detector arrangement for developing electrical pulses in the output circuits thereof. For example, the detectors 12 and 14 may comprise a suitable scintillation counter arrangement such as is described in detail in a copending application of William R. Rabson and Thomas A. Rabson, Serial No. 287,692 filed June 13, 1963, now U.S. Patent No. 3,265,893, which is assigned to the same assignee as the present invention. Preferably, one of the detectors, such as the C channel detector 14, is positioned near the bottom end of the subsurface unit and adjacent thereto is positioned a suitable source of neutrons, such as radium beryllium, for example. In the event natural gamma rays are to be detected simultaneously with radiations resulting from this neutron source, the natural gamma ray detector, i.e., the A channel detector 12 is preferably positioned somewhat above the detector 14 and the electronic circuitry of the other component units of the subsurface unit is preferably positioned in the space between the detectors 14 and 12 so as to provide sufficient attenuation of the gamma rays inherently produced by the neutron source at the bottom of the instrument to prevent an appreciable response in the natural gamma ray detector 12.

In the event the C channel detector 14 is to be arranged to detect gamma rays of capture which are produced in the formations as a result of neutron bombardment, the detector 14 may also be a scintillation counter arrangement such as described in the above-identified Rabson, et al. application. In the alternative, detector 14 may comprise any suitable gas-filled counter which is arranged to detect slow neutrons in the event that it is desired to provide a slow neutron curve simultaneously with a natural gamma ray curve.

Considering now in more detail the operation of the circuitry provided in the subsurface unit whereby composite pulses of the wave form contemplated by the present invention are developed, it is pointed out that each of the pulse shaping circuits 20 and 22 is arranged to convert the relatively sharp output pulses developed by the respective preamplifiers 16 and 18 into pulses of relatively long duration. For example, while the output pulses of the detector 12 and 14 may have a duration in the order of one microsecond, selected ones of these pulses are preferably converted by the pulse shaping circuits 20 and 22 into pulses having a duration in the order of 0.5 millisecond. To accomplish this, the pulse shaping circuits 20 and 22 preferably include a monostable multivibrator which is capable of being triggered, or turned on, by means of the output pulses from the preceding preamplifier and produces an output pulse of fixed duration in the order of 0.5 millisecond in response thereto. If desired, facilities may be provided for disabling either the A channel or the C channel pulse shaping circuit 20 or 22 during periods when the pulse shaping circuit of the opposite channel is generating an output pulse. Such an arrangement has the advantage that only a pulse from one channel is applied to the cable 10 at a given time.

The outputs of the pulse shaping circuits are, in accordance with an important feature of the invention, purposely distorted so that each of these pulses will have an overshoot portion of the opposite polarity which overshoot portion has almost exactly the same pulse area as the original square wave pulse. By pulse area is meant the area bounded by the pulse itself and the AC zero axis of the wave form. Furthermore, the supporting cable 10 to which these purposely distorted pulses are applied is treated as a transmission line and is terminated in the relatively low impedance of the resistor 32 at the surface which approximates the characteristic impedance of this transmission line. Such low impedance termination has the effect of eliminating further oscillatory transients of either polarity, other than the above-described equal area overshoot pulse portion. Thus, the complete pulse wave form on the cable 10 will include first composite pulses having relatively wide first portions corresponding to one detector channel which are of one polarity and are immediately followed by overshoot portions of the opposite polarity and of substantially the same area. In addition, the composite pulses corresponding to the other detector are applied to the cable 10 and comprise relatively wide first portions of said opposite polarity which are immediately followed by overshoot portions of said one polarity and of the same area as the immediately preceding first portion.

While such an arrangement would appear to preclude adequate and satisfactory separation of the pulses from the two detector channels at the earth's surface, we have found that extremely accurate separation of these pulses may be achieved by first passing the composite wave form appearing on the cable through an integration circuit provided in the surface equipment. The two outputs of this integration circuit when properly separated by pulse height selectors, consists of large amplitude pulses of one polarity corresponding to one detector channel, without any appreciable overshoot portions, and large amplitude pulses of the opposite polarity corresponding to the other detector channel, also without any appreciable overshoot portions. However, the integration circuit at the earth's surface must be extremely fast acting to provide substantially instantaneous integration of each equal area pulse and overshoot combination. Furthermore, provisions are included in the surface equipment to modify the respective areas of the pulse and overshoot portions so that any residual overshoot portion may be completely removed, as will be described in more detail hereinafter.

Considering now the manner in which the pulses developed by the circuits 20 and 22 are applied to the cable 10, it is first pointed out that the multivibrator output pulses developed by these circuits include much lower frequency components than the sharp pulses developed by the detectors 12 and 14 and hence may be more readily applied to the cable 10 through a suitable inductive coupling network and transmitted over this cable to the earth's surface without complete deterioration of the pulse due to the capacity between the cable conductors. To this end, the coupling transformer 24 is provided with a center tapped primary winding 80 the center tap of which is connected to the supply voltage supplied to the subsurface unit and developed across the capacitor 38. One end of the winding 80 is connected through a resistor 82 to the collector of a switching transistor 84, the emitter of which is connected to ground through a Zener diode 86. The base of the transistor 84 is connected to ground through a voltage divider network including the resistors 88 and 89. The output of the circuit 20 is connected to the junction of the resistors 88 and 89 so as to provide a positive switching signal at the base of the transistor 84 for the duration of the output pulse of the circuit 20. The Zener diode 86 provides emitter bias which is sufficient to keep the switching transistor 84 from conducting even though the subsurface unit is operating at high temperatures in the order of 200° C.

When the above-described positive pulse is applied to the transistor 84, this transistor conducts, and the Zener diode 86 will also conduct heavily so that a very low impedance is present in the circuit from the emitter of the transistor 84 to ground. As a result, a large current flows through the transistor 84, the resistor 82 and the left-hand portion of the center tapped winding 80 for the duration of the multivibrator pulse applied to the base of the transistor 84. This composite output pulse is inductively coupled to the secondary windings 36 and 40 of the coupling transformer 24 and is applied to the conductors 34 and 42 of the cable 10. When the transistor 84 is turned off at the end of the input square wave the energy stored in the transformer 24 must be dissipated and hence a large overshoot portion of a polarity opposite to the output pulse is produced immediately following the output pulse. The shape of this overshoot portion is determined by many factors including the inductance of this portion of the winding 80, the current flow therethrough, the supply voltage, the value of the resistor 82, the characteristics of the transistor 84 and diode 86 and the load presented by the cable 10. All of these factors are correlated so that the area of the overshoot portion is equal to, or preferably just slightly greater than, the area of the immediately preceding output pulse. Furthermore, these factors and particularly the loading on the windings 80, 36 and 40 are so chosen that the overshoot portion comprises a single half-cycle of oscillation rather than a series of damped oscillations of alternately opposite polarity, for reasons to be described in more detail hereinafter.

In a similar manner, the multivibrator pulses developed by the C channel pulse shaping circuit 22 are applied to a switching transistor 102 and when this transistor is turned on by the multivibrator output pulse, current flows through a series load resistor 104 and the right-hand portion of the center tapped winding. This C channel composite output pulse is inductively coupled to the secondary windings 36 and 40 of the transformer 24 and is applied to the conductors 34 and 42 of the cable 10 with a polarity opposite to that of the A channel pulses. Due to the above-described factors the C channel composite output pulses comprise a first portion corresponding to the applied square wave and are also immediately followed by an overshoot portion of the opposite polarity and of approximately the same pulse area. It will thus be seen that the composite A channel pulses are applied to the conductors 34 and 42 through the windings 36 and 40 and the composite C channel pulses are also applied through these secondary windings to the same conductors. Such an arrangement provides a balanced circuit for driving the conductors 34, 42 of the cable 10 and helps minimize pickup due to capacitive coupling to a sheath of the cable and other conductors.

Considering now the surface equipment, the output signals developed in the subsurface unit, which include the composite pulses corresponding to the A channel and C channel detectors, are developed across the resistor 32 connected in series with the conductor 34 of the cable 10. However, there may also be undesired voltage components present on the conductor 34 due to capacitive or inductive pickup, or other signals due to incomplete filtering within the subsurface unit. Accordingly, it is necessary to select the voltage developed across the resistor 32, which is proportional to current flow through the cable 10 while rejecting the other extraneous voltages which may be considered to be "common mode" signals. To this end, the voltage developed across the resistor 32 is applied to the input circuit of the differential amplifier 50 so that a relatively high degree of common mode rejection is provided.

The signal amplified in the amplifier 50 is reproduced in amplified form as a single-ended signal across the output winding 52. More particularly, the composite pulses representing the A and C channel signals are supplied through a potentiometer 120 of relatively low ohmic value, which performs a ratio or balancing adjustment between the A and C channel pulses, as will be described in more detail hereinafter, and through a pair of parallel connected, reversely-polarized clipping diodes 121 and 122 to the input of a high gain amplifier 123. The junction of the potentiometer 120 and the diodes 121, 122 is connected through an integrating capacitor 125 and a suppression potentiometer 126 to ground. A relatively large resistor 127 is connected from the upper side of the capacitor 125 to a regulated negative voltage source 128. The arm of the ratio potentiometer 120 is connected through a relatively large resistor 130 to a regulated positive voltage source 132.

Preferably, the high gain amplifier 123 comprises a series of several direct-coupled amplifier stages which are provided with suitable facilities for preventing self-oscillation so that the signal applied to the input of the amplifier 123 is accurately reproduced at the output thereof in amplified form.

In order to provide a fast acting integrator circuit which will be capable of integrating the positive and negative portions of the composite wave forms on an individual pulse basis, there is provided a capacitive feedback circuit connected between the output and the input of the amplifier 123. More particularly, a feedback capacitor 140 is connected from the output of the high gain amplifier 123 to the right-hand side of the clipping diodes 121 and 122 to provide an integrating or summation function of the composite pulse signals applied to the input of the amplifier 123.

Figure 2A:
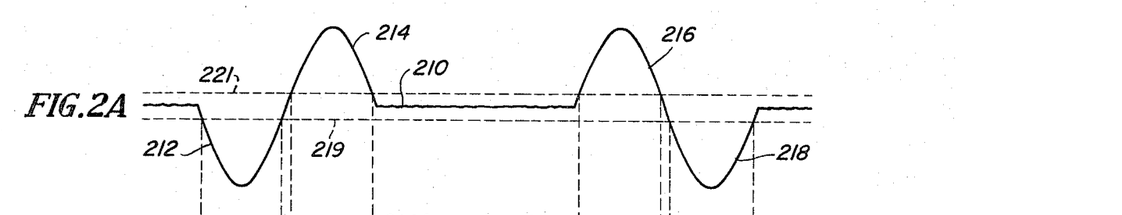
FIGS. 2A to 2E are wave forms useful in illustrating the operation of the system of FIG. 1.

Considering now the function of the potentiometers 120 and 126 in providing desired modifications in the wave form of the composite pulse signals representing the A and C channels and the action of the above-described integrator circuit in providing the desired output pulses of different polarity corresponding to the A and C channels, it is first pointed out that the clipping diodes 121 and 122, which are reverse-connected, prevent the transmission of any signals to the input of the amplifier 123 which are of less amplitude than the conduction value of these diodes. Referring to FIG. 2A, the wave form developed across the output winding 52 customarily comprises a base line 210 on which small voltage pulses due to undesired noise and stray pickup appear. The pulse wave form corresponding to one of the detector channels, such as the A channel, will comprise a negative going pulse portion 212 which is immediately followed by an overshoot portion 214 of substantially the same shape and area as the pulse portion 212. In a similar manner, the pulse wave form corresponding to the opposite detector channel, such as the C channel, will comprise a positive going pulse portion 216 which is immediately followed by an overshoot portion of the opposite polarity 218 which is of substantially the same amplitude and area as the portion 216. In this connection it will be understood that the initial pulse portions 212 and 216 are developed from multivibrator pulses of square wave configuration. However, the sharp corners of these pulses become rounded off in the output circuits of the transistors 84 and 102 and in transmission through the cable 10 and in the amplifier 50 so that they are essentially sinusoidal when presented to the integrator 54.

Figure 2B:
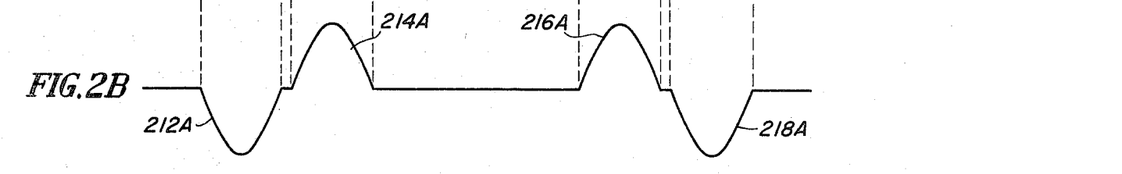

The values of the resistor 130, the potentiometer 120 and the resistor 127 are so chosen that the D.C. potential at the left-hand side of the diodes 121, 122 may be varied from a value of approximately minus 0.5 volt to plus 0.5 volt with respect to ground by adjustment of the potentiometer 120. If the potentiometer 120 is adjusted to its midpoint, the potential at the left-hand side of the diodes 121, 122 is ground or zero and the diode 121 will conduct at a slightly negative potential, indicated by the dotted line 219 in FIG. 2A, whereas the diode 122 will conduct at a slightly positive voltage indicated by the clipping level 221 in FIG. 2A. Accordingly, the diodes 121 and 122 function to eliminate all portions of the composite wave form between the two clipping levels 219 and 221. As will be seen from FIG. 2A, this includes any undesired noise pulses of small amplitude on the base line 210. Accordingly, the actual signal transmitted to the input of the amplifier 123 is as shown in FIG. 2B wherein the pulse portions 212, 214, 216, and 218 are of slightly reduced amplitude and are indicated as the pulse portions 212A, 214A, 216A and 218A.

The pulse wave form illustrated in FIG. 2A assumes that the amplitude and wave shape of the pulses from the two pulse detector channels are essentially equal. However, in actual practice the pulses developed in the output of one of the pulse driver circuits in the subsurface unit may not be exactly similar to the output pulses developed in the other channel. These wave forms may differ as shown, for example, in FIG. 2C, wherein the amplitude of the negative pulse portion 212B produced in the A channel may be somewhat smaller than the overshoot portion 214B. On the other hand, the amplitude of the pulse portion 216B corresponding to the C channel signal may be somewhat larger than the overshoot portion 218B which immediately follows the portion 216B. Since the succeeding integrator circuit will function to provide the desired unidirectional output pulses without accompanying overshoot portions only if the areas of the original pulse and overshoot portions are substantially equal, it is necessary to equalize or balance these pulse portions both between channels and in each individual channel in order to achieve the desired end result.

If the ratio or balance potentiometer 120 is moved toward the upper end thereof, the potential at the left-hand side of the clipping diodes 121 and 122 is decreased, whereas if the arm of this potentiometer is moved to the lower end of this potentiometer, the D.C. potential about which the clipping diodes 121 and 122 function will be somewhat increased.

Figure 2C:
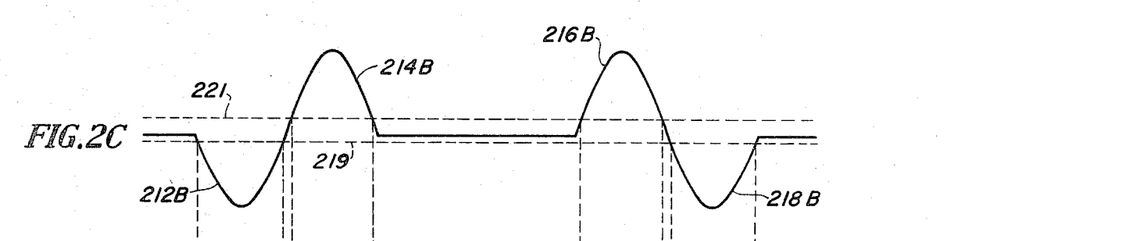
Figure 2D:
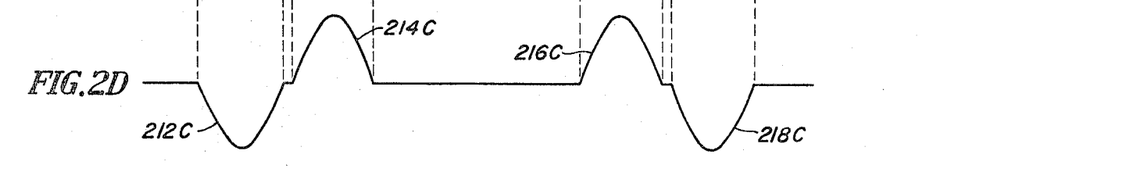

Accordingly, adjustment of the ratio potentiometer 120 permits at least a partial equalization of the pulses in the two channels. Thus, if the potentiometer 120 is adjusted so that the lower clipping level 219 is almost at ground potential, as shown in FIG. 2C, then the upper clipping level 221 will be proportionately higher as shown in FIG. 2C. The diodes 121, 122 will then function to clip a proportionately greater amount from the pulse portions 214B and 216B and will remove very little area from the pulse portions 212B and 218B. Accordingly, the output wave form applied to the input of the amplifier 123 will appear as shown in FIG. 2D wherein it will be seen that the area of the pulse portion 212C has been made approximately equal to the overshoot portion 214C and the pulse portion 216C has been made approximately equal to the area of the overshoot portion 218C. In this connection, it will be understood that the wave forms in FIGS. 2A to 2E, inclusive, have been somewhat idealized to illustrate the principle of operation, and in actual practice, the pulse wave forms may vary somewhat from those shown in these figures. It is also pointed out that whereas the overshoot portions corresponding to the pulses in both channels have been shown as having an area approximately equal to the preceding pulse portion, in actual practice the overshoot portion is purposely made to have a somewhat larger area in the subsurface unit so as to permit a precise vernier adjustment by means of the suppression potentiometer 126, as will be described in more detail hereinafter.

Figure 2E:
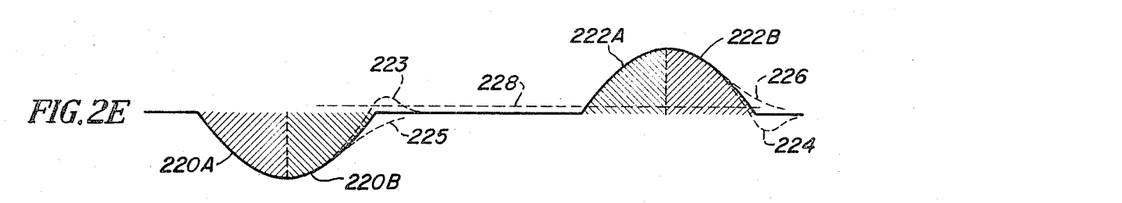

Assuming that the wave form of FIG. 2B is applied to the input of the amplifier 123, the high gain amplifier with capacitive feedback will function to integrate the applied composite pulse wave form. Thus, the integration circuit will function to integrate the pulse portion 212A so as to produce the first half 220A (FIG. 2E) of a large amplitude output pulse and during the overshoot portion 214A the integrator will integrate this portion to provide the succeeding half portion 210B of the desired output pulse. If the areas of the pulse portions 212A and 214A are exactly equal, the integrator circuit will provide an output pulse, as shown in FIG. 2E, which will be exactly unidirectional and will have no overshoot portion extending above the zero axis which could be confused with a pulse of the opposite polarity in the other pulse detector channel. In a similar manner, the integrator circuit will integrate the pulse portion 216A corresponding to the opposite pulse channel to provide the rising pulse portion 222A and will integrate the overshoot portion 218A to provide the falling pulse portion 222B. Again, if the areas of the pulse 216A and the overshoot portion 218A are exactly equal, the output pulse 222A, 222B will be entirely unidirectional and will have no overshoot.

If the areas of the overshoot portions 214A and 218A are larger than the preceding pulse portions 213A or 216A, then the output of the integrator circuit will extend beyond the base line and provide an undesired overshoot portion as indicated in dotted lines at 223 in FIG. 22 in connection with the negative output pulse and at dotted lines at 224 in connection with the positive output pulse representing the other channel. On the other hand, if the area of the overshoot portions 214A and 218A is less than the original pulse portions 212A and 216A, then the output pulse will not come back immediately to the zero axis but instead will tail off as indicated by the dotted lines 225 and 226, in FIG. 2E. While the so-called undershoot portions 225 and 226 do not cause interference in the opposite channel, they are, nevertheless, undesirable because they will produce buildup of a unidirectional voltage component if detector pulses occur relatively close together and the next pulse in the same channel occurs before the end of the tailoff portion 225. Such a unidirectional voltage component in the output of circuit 50 would be extremely undesirable and would interfere with the long-term stability and accuracy of the system.

While the original pulse portion, such as the portion 212 in FIG. 2A has been ideally shown as being of the same area as the following overshoot portion 214, in actual practice the overshoot portion following the pulse in either channel is purposely made to have a larger area than the original pulse. This may be conveniently done by suitable design of the coupling transformer 24 in the subsurface unit, the series resistor 82 which controls the magnitude of current flowing through the winding 80 during conduction of the transistor 84, or the duration of current flow, i.e., the duration of the multivibrator pulse produced in the circuit 20. All of these factors may be adjusted so that the overshoot portion following the initial pulse is of somewhat larger area than the original pulse. This means that under normal operating conditions there will always be a small overshoot portion, such as the portions 223 and 224 (FIG. 2E) in the integrated output pulses. However, adjustment of the ratio potentiometer 120 is first employed to obtain as good a balance as possible between channels. Thus, by adjustment of the potentiometer 120 the amplitudes of the overshoot portions 223 and 224 may be adjusted to obtain a point at which both overshoot portions are a minimum. As the potentiometer 120 is adjusted in one direction from this minimum point, the amplitude of one overshoot portion, such as the portion 223, may increase, and the portion 224 in the opposite channel may decrease. Adjustment of the potentiometer to the opposite side of this minimum point will cause the overshoot portion 224 to increase and the portion 223 to decrease. Thus, the ratio control is employed to balance the two channels and minimizes rather than removes the overshoot portions themselves.

In order to remove the overshoot portions from both of the oppositely polarized pulses at the same time, there is provided the suppression control or potentiometer 126 which is connected in series with the capacitor 125 to the left-hand side of the clipping diodes 121, 122. If the potentiometer 126 is adjusted to zero resistance so that the lower end of the capacitor 125 is connected to ground, it will be evident that a certain amount of integration will be provided due to the series connection of the potentiometer 120, which preferably has a resistance value of 1,000 ohms, and the shunt capacitor 125, which preferably has a capacitance value of .22 microfarad. On the other hand, when the potentiometer 126 is adjusted to put its full resistance in the circuit, the integration provided by the capacitor 125 is greatly decreased, since the potentiometer 126 preferably has a value in the order of 5,000 ohms. By adjustment of the potentiometer 126, the overshoot portions 223 and 224 in both channels may be simultaneously removed and an output wave form substantially equal to that shown in full lines in FIG. 2E obtained. This is because the integration provided by the potentiometer 120 and the capacitor 125 functions to add area to the initial pulse portion, such as the portion 212 (FIG. 2A), and remove area from the overshoot portion 214. Furthermore, this integration is effective regardless of pulse polarity. Thus, the integration of the potentiometer 120 and the capacitor 125 will be equally effective to increase the area of the pulse portion 216 and reduce the area of the overshoot portion 218, since the elements 120, 125, 126 operate on a time basis rather than a polarity basis. Accordingly, in accordance with this important feature of the invention, the suppression potentiometer 126 may be adjusted to suppress exactly the overshoot portion which has previously been balanced by adjustment of the potentiometer 120 so that completely unidirectional output pulses of opposite polarity are obtained in the output of the amplifier 123. In this connection it will be noted that the full resistance of the potentiometer 120 is utilized in overshoot suppression at all times, irrespective of the adjustment of this potentiometer to obtain an initial balance adjustment. Accordingly, adjustment of the suppression potentiometer 126 is not affected by adjustment of the balance or ratio potentiometer 126 and interaction between these adjustments is minimized.

In order to provide additional amplification of the above-described output wave forms developed in the output of the amplifier 123, there is provided a further amplifier 142. The amplifier 142 is also a direct-coupled multi-stage high gain amplifier and the output thereof is connected to the input of the amplifier 123 through a resistor 144 to provide a high degree of stability for the integrator circuit 54. Preferably, the entire circuit from the output winding 52 to the input of the rate meter circuits 60 and 62 is direct-coupled and is stabilized by the resistive feedback 144 so that the operation of this portion of the equipment remains substantially constant despite wide variations in operating temperature. However, the resistive feedback provided by the resistor 144 does tend to shunt the feedback capacitor 140 to ground so that the integration provided by the above-described high gain amplifier 123 is not complete and may introduce a slight amount of overshoot. This overshoot can be removed by adjustment of the suppression potentiometer 126, in the manner described heretofore.

The output stage of the amplifier 142 is preferably differential so as to provide separate outputs for the rate meter circuit 60 and the rate meter circuit 62. Since the composite wave form is inverted in polarity at these two outputs each rate meter circuit selects only those pulses occurring above a predetermined, adjustable triggering level and will reject all pulses of the opposite channel which are below this level. For example, referring to FIG. 2E, one of the rate meter circuits may be set with a triggering level indicated at 228 so as to select the positive pulses 222A, 222B. On the other hand, when the wave form of FIG. 5E is inverted on the other differential output circuit, the triggering level of the other rate meter circuit may be again set slightly positive with respect to zero and will select the inverted pulse portions 220A, 220B. In this connection, it will be understood that both triggering levels may be adjusted to any desired voltage level above the base line to select any desired portion of the unidirectional signal pulse. It will also be noted that since no overshoot portions such as the portions 223 in FIG. 2E are present in the output pulse wave form the triggering levels may be moved relatively close to the base line to select a minimum amplitude of signal pulse of the desired polarity while rejecting all portions of the signal pulses of the opposite polarity and all noise pulses along the base line.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a well logging system, a subsurface unit, a cable for moving said unit within a bore hole, first and second detectors in said unit and each arranged to produce a pulse type signal, means included in said subsurface unit for converting pulses from each of said detectors into a composite pulse consisting essentially of equal area pulse portions of opposite polarity, means for transmitting said composite pulses over said cable to the earth's surface, and pulse integrator means located at the earth's surface and connected to said cable, said pulse integrator means having a time constant such that each of said composite pulses is converted into a unidirectional pulse having substantially no overshoot portion of the opposite polarity, said unidirectional pulses corresponding to one of said detectors being of the opposite polarity from those unidirectional pulses corresponding to the other of said detectors.

2. In a well logging system, a subsurface unit, a cable for moving said unit within a bore hole, first and second detectors in said unit and each arranged to produce a pulse type signal, means included in said subsurface unit for converting pulses from each of said detectors into a composite pulse consisting essentially of equal area pulse portions of opposite polarity, means for transmitting said composite pulses over the same conductor of said cable to the earth's surface, and pulse integrator means located at the earth's surface and connected to said conductor of said cable, said pulse integrator means having a time constant such that each of said composite pulses is converted into a unidirectional pulse having substantially no overshoot portion of the opposite polarity, said unidirectional pulses corresponding to one of said detectors being of the opposite polarity from those unidirectional pulses corresponding to the other of said detectors.

3. In a well logging system, a subsurface unit, a cable for moving said unit within a bore hole, first and second detectors in said unit and each arranged to produce a pulse type signal, means for converting a pulse from said first detector into a first composite pulse of considerably longer duration than the detector pulse, said first composite pulse having a first portion of one polarity followed by a second portion of the opposite polarity, means for converting a pulse from said second detector into a second composite pulse of considerably longer duration than the detector pulse, said second composite pulse having a first portion of said opposite polarity followed by a second portion of said one polarity, means for transmitting said first and second composite pulses over the same conductor of said cable to the earth's surface, and pulse integrator means located at the earth's surface and connected to said conductor of said cable, said pulse integrator means having a time constant such that each of said composite pulses is converted into a unidirectional pulse having substantially no overshoot portion of the opposite polarity, said unidirectional pulses corresponding to one of said detectors being of the opposite polarity from those unidirectional pulses corresponding to the other of said detectors.

4. In a well logging system, a subsurface unit, a cable for moving said unit within a bore hole, first and second detectors in said unit and each arranged to produce a pulse type signal, means for converting a pulse from said first detector into a first composite pulse of considerably longer duration than the detector pulse, said first composite pulse having a first portion of one polarity followed by a second portion of the opposite polarity, means for converting a pulse from said second detector into a second composite pulse of considerably longer duration than the detector pulse, said second composite pulse having a first portion of said opposite polarity followed by a second portion of said one polarity, said first and second portions of said composite pulses having approximately equal areas, means for transmitting said first and second composite pulses over the same conductor of said cable to the earth's surface, and pulse integrator means located at the earth's surface and connected to said conductor of said cable, said pulse integrator means having a time constant such that each of said composite pulses is converted into a unidirectional pulse having substantially no overshoot portion of the opposite polarity, said unidirectional pulses corresponding to one of said detectors being of the opposite polarity from those unidirectional pulses corresponding to the other of said detectors.

5. In a well logging system, a subsurface unit, a cable for moving said unit within a bore hole, first and second detectors in said unit and each arranged to produce a pulse type signal, means included in said subsurface unit for converting pulses from each of said detectors into a composite pulse having oppositely polarized portions of approximately equal areas, means for transmitting said composite pulses over the same conductor of said cable to the earth's surface, pulse integrator means at the earth's surface to which said composite pulses are applied, said pulse integrator means having a time constant such that each of said composite pulses is converted into a unidirectional pulse having substantially no overshoot portion of the opposite polarity, and balancing means for adjusting the wave form of composite pulses corresponding to one of said detectors relative to composite pulses corresponding to the other of said detectors, said unidirectional pulses corresponding to one of said detectors being of the opposite polarity from those unidirectional pulses corresponding to the other of said detectors.

6. In a well logging system, a subsurface unit, a cable for moving said unit within a bore hole, first and second detectors in said unit and each arranged to produce a pulse type signal, means included in said subsurface unit for developing pulses of relatively long duration in response to pulses produced by said first and second detectors, means included in said unit for converting said long duration pulses corresponding to pulses from said first detector into first composite pulses each having a first portion of a duration approximately equal to that of the long duration pulse followed by a second portion of opposite polarity and having an area approximately equal to the area of said first portion, means included in said unit for converting said long duration pulses corresponding to pulses from said second detector into second composite pulses each having a first portion of a duration approximately equal to that of the long duration pulse followed by a second portion of opposite polarity having an area approximately equal to the area of said first portion thereof, means for transmitting said first and second composite pulses over the same conductor of said cable to the earth's surface as oppositely polarized composite pulses, and pulse integrator means located at the earth's surface and connected to said conductor, said pulse integrator means having a time constant such that each of said composite pulses is converted into a unidirectional pulse having substantially no overshoot portion of the opposite polarity, said unidirectional pulses corresponding to one of said detectors being of the opposite polarity from those unidirectional pulses corresponding to the other of said detectors.

7. In a well logging system, a subsurface unit, a cable for moving said unit within a bore hole, first and second detectors in said unit and each arranged to produce a pulse type signal, means included in said subsurface unit for developing pulses of relatively long duration in response to pulses produced by said first and second detectors, means included in said unit for converting said long duration pulses corresponding to pulses from said first detector into first composite pulses each having a first portion of a duration approximately equal to that of the long duration pulse followed by a second portion of opposite polarity having an area slightly greater than the area of said first portion, means included in said unit for converting said long duration pulses corresponding to pulses from said second detector into second composite pulses each having a first portion of a duration approximately equal to that of the long duration pulse followed by a second portion of opposite polarity having an area slightly greater than the area of said first portion thereof, means for transmitting said first and second composite pulses over the same conductor of said cable to the earth's surface as oppositely polarized composite pulses, pulse integrator means located at the earth's surface and having a time constant such that each of said composite pulses is converted into a unidirectional pulse having only a slight overshoot portion of the opposite polarity, said unidirectional pulses corresponding to one of said detectors being of the opposite polarity from those unidirectional pulses corresponding to the other of said detectors, and balancing means at the earth's surface for equalizing said slight overshoot portions of said oppositely polarized unidirectional pulses.

8. In a well logging system, a subsurface unit, a cable for moving said unit within a bore hole, first and second detectors in said unit and each arranged to produce a pulse type signal, means included in said subsurface unit for developing pulses of relatively long duration in response to pulses produced by said first and second detectors, means included in said unit for converting said long duration pulses corresponding to pulses from said first detector into first composite pulses each having a first portion of a duration approximately equal to that of the long duration pulse followed by a second portion of opposite polarity having an area slightly greater than the area of said first portion, means included in said unit for converting said long duration pulses corresponding to pulses from said second detector into second composite pulses each having a first portion of a duration approximately equal to that of the long duration pulse followed by a second portion of opposite polarity having an area slightly greater than the area of said first portion thereof, means for transmitting said first and second composite pulses over the same conductor of said cable to the earth's surface as oppositely polarized composite pulses, pulse integrator means located at the earth's surface and having a time constant such that each of said composite pulses is converted into a unidirectional pulse having only a slight overshoot portion of the opposite polarity, said unidirectional pulses corresponding to one of said detectors being of the opposite polarity from those unidirectional pulses corresponding to the other of said detectors, balancing means at the earth's surface for equalizing said slight overshoot portions of said oppositely polarized unidirectional pulses, and overshoot suppression means for removing said slight overshoot portions from said oppositely polarized unidirectional pulses.

9. In a well logging system, a subsurface unit, a cable for moving said unit within a bore hole, first and second detectors in said unit and each arranged to produce a pulse type signal, means included in said subsurface unit for developing pulses of relatively long duration in response to pulses produced by said first and second detectors, means included in said unit for converting said long duration pulses corresponding to pulses from said first detector into first composite pulses each having a first portion of a duration approximately equal to that of the long duration pulse followed by a second portion of opposite polarity having an area slightly greater than the area of said first portion, means included in said unit for converting said long duration pulses corresponding to pulses from said second detector into second composite pulses each having a first portion of a duration approximately equal to that of the long duration pulse followed by a second portion of opposite polarity having an area slightly greater than the area of said first portion thereof, means for transmitting said first and second composite pulses over the same conductor of said cable to the earth's surface as oppositely polarized composite pulses, pulse integrator means located at the earth's surface and having a time constant such that each of said composite pulses is converted into a unidirectional pulse having only a slight overshoot portion of the opposite polarity, said unidirectional pulses corresponding to one of said detectors being of the opposite polarity from those unidirectional pulses corresponding to the other of said detectors, balancing means at the earth's surface for equalizing said slight overshoot portions of said oppositely polarized unidirectional pulses, and overshoot suppression means for removing said slight overshoot portions from said oppositely polarized unidirectional pulses by adding to the area of said first portions of said first and second composite pulses and subtracting from the area of said second portions of said first and second composite pulses.

10. In a well logging system, a subsurface unit, a cable for moving said unit within a bore hole, first and second detectors in said unit and each arranged to produce a pulse type signal, means included in said subsurface unit for developing pulses of relatively long duration in response to pulses produced by said first and second detectors, means included in said unit for converting said long duration pulses corresponding to pulses from said first detector into first composite pulses each having a first portion of a duration approximately equal to that of the long duration pulse followed by a second portion of opposite polarity having an area approximately equal to the area of said first portion, means included in said unit for converting said long duration pulses corresponding to pulses from said second detector into second composite pulses each having a first portion of a duration approximately equal to that of the long duration pulse followed by a second portion of opposite polarity having an area approximately equal to the area of said first portion thereof, means for transmitting said first and second composite pulses over the same conductor of said cable to the earth's surface as oppositely polarized composite pulses, noise clipping means at the earth's surface for removing noise pulses occurring in the intervals between said composite pulses, and pulse integrator means located at the earth's surface and connected to the output of said noise clipping means, said pulse integrator means having a time constant such that each of said composite pulses is converted into a unidirectional pulse having substantially no overshoot portion of the opposite polarity, said unidirectional pulses corresponding to one of said detectors being of the opposite polarity from those unidirectional pulses corresponding to the other of said detectors.

11. In a well logging system, a subsurface unit, a cable for moving said unit within a bore hole, first and second detectors in said unit and each arranged to produce a pulse type signal, means included in said subsurface unit for developing pulses of relatively long duration in response to pulses produced by said first and second detectors, means included in said unit for converting said long duration pulses corresponding to pulses from said first detector into first composite pulses each having a first portion of a duration approximately equal to that of the long duration pulse followed by a second portion of opposite polarity having an area approximately equal to the area of said first portion, means included in said unit for converting said long duration pulses corresponding to pulses from said second detector into second composite pulses each having a first portion of a duration approximately equal to that of the long duration pulse followed by a second portion of opposite polarity having an area approximately equal to the area of said first portion thereof, means for transmitting said first and second composite pulses over the same conductor of said cable to the earth's surface as oppositely polarized composite pulses, pulse amplifier means connected to said conductor at the earth's surface and arranged to amplify both said first and second composite pulses, noise clipping means connected to the output of said pulse amplifier means for removing noise pulses occurring in the intervals between said composite pulses, and pulse integrator means located at the earth's surface and connected to the output of said noise clipping means, said pulse integrator means having a time constant such that each of said composite pulses is converted into a unidirectional pulse having substantially no overshoot portion of the opposite polarity, said unidirectional pulses corresponding to one of said detectors being of the opposite polarity from those unidirectional pulses corresponding to the other of said detectors.

12. In a well logging system, a subsurface unit, a cable for moving said unit within a bore hole, first and second detectors in said unit and each arranged to produce a pulse type signal, means included in said subsurface unit for developing pulses of relatively long duration in response to pulses produced by said first and second detectors, means included in said unit for converting said long duration pulses corresponding to pulses from said first detector into first composite pulses each having a first portion of a duration approximately equal to that of the long duration pulse followed by a second portion of opposite polarity having an area approximately equal to the area of said first portion, means included in said unit for converting said long duration pulses corresponding to pulses from said second detector into second composite pulses each having a first portion of a duration approximately equal to that of the long duration pulse followed by a second portion of opposite polarity having an area approximately equal to the area of said first portion thereof, means for transmitting said first and second composite pulses over the same conductor of said cable to the earth's surface as oppositely polarized composite pulses, pulse amplifier means connected to said conductor at the earth's surface and arranged to amplify both said first and second composite pulses, a pair of parallel connected oppositely polarized diodes, pulse integrator means, and means connecting said parallel connected diodes between said pulse amplifier means and the input of said pulse integrator means, thereby to prevent the transmission of noise impulses of small amplitude to said pulse integrator means during the intervals between said composite pulses, said pulse integrator means having a time constant such that each of said composite pulses is converted into a unidirectional pulse having substantially no overshoot portion of the opposite polarity, said unidirectional pulses corresponding to one of said detectors being of the opposite polarity from those unidirectonal pulses corresponding to the other of said detectors.

13. In a well logging system, a subsurface unit, a cable for moving said unit within a bore hole, first and second detectors in said unit and each arranged to produce a pulse type signal, means included in said subsurface unit for developing pulses of relatively long duration in response to pulses produced by said first and second detectors, means included in said unit for converting said long duration pulses corresponding to pulses from said first detector into first composite pulses each having a first portion of a duration approximately equal to that of the long duration pulse followed by a second portion of opposite polarity having an area approximately equal to the area of said first portion, means included in said unit for converting said long duration pulses corresponding to pulses from said second detector into second composite pulses each having a first portion of a duration approximately equal to that of the long duration pulse followed by a second portion of opposite polarity having an area approximately equal to the area of said first portion thereof, means for transmitting said first and second composite pulses over the same conductor of said cable to the earth's surface as oppositely polarized composite pulses, pulse amplifier means connected to said conductor at the earth's surface and arranged to amplify both said first and second composite pulses, a pair of parallel connected oppositely polarized diodes, pulse integrator means, a variable bias network, means including said network for connecting said parallel connected diodes between said pulse amplifier means and the input of said pulse integrator means, thereby to prevent the transmission of noise impulses of small amplitude to said pulse integrator means during the intervals between said composite pulses, adjustment of said variable bias network being effective to adjust the relative areas of said first and second portions of said composite pulses, said pulse integrator means having a time constant such that each of said composite pulses is converted into a unidirectional pulse having substantially no overshoot portion of the opposite polarity, said unidirectional pulses corresponding to one of said detectors being of the opposite polarity from those unidirectional pulses corresponding to the other of said detectors, and a work circuit connected to the output of said pulse integrator means.

14. In a well logging system, a subsurface unit, a cable for moving said unit within a bore hole, first and second detectors in said unit and each arranged to produce a pulse type signal, means included in said subsurface unit for developing pulses of relatively long duration in response to pulses produced by said first and second detectors, means included in said units for converting said long duration pulses corresponding to pulses from said first detector into first composite pulses each having a first portion of a duration approximately equal to that of the long duration pulse followed by a second portion of opposite polarity having an area approximately equal to the area of said first portion, means included in said unit for converting said long duration pulses corresponding to pulses from said second detector into second composite pulses each having a first portion of a duration approximately equal to that of the long duration pulse followed by a second portion of opposite polarity having an area approximately equal to the area of said first portion thereof, means for transmitting said first and second composite pulses over the same conductor of said cable to the earth's surface as oppositely polarized composite pulses, pulse amplifier means connected to said conductor at the earth's surface and arranged to amplify both said first and second composite pulses, a pair of parallel connected oppositely polarized diodes, a pulse integrator comprising a high gain amplifier and a capacitative feedback circuit connected between the output and input of said high gain amplifier, means connecting one side of said parallel connected diodes to the input of said high gain amplifier, means connecting the output of said pulse amplifier means to the other side of said parallel connected diodes, whereby noise impulses which are of an amplitude less than the conduction potential of said diodes are not transmitted to the input of said high gain amplifier, said integrator circuit having a time constant such that each of said composite pulses is converted into a unidirectional pulse having substantially no overshoot portion of the opposite polarity, said unidirectional pulses corresponding to one of said detectors being of the opposite polarity from those unidirectional pulses corresponding to the other of said detectors, and a work circuit connected to the output of said high gain amplifier.

15. In a well logging system, a subsurface unit, a cable for moving said unit within a bore hole, first and second detectors in said unit and each arranged to produce a pulse type signal, means included in said subsurface unit for developing pulses of relatively long duration in response to pulses produced by said first and second detectors, means included in said unit for converting said long duration pulses corresponding to pulses from said first detector into first composite pulses each having a first portion of a duration approximately equal to that of the long duration pulse followed by a second portion of opposite polarity having an area approximately equal to the area of said first portion, means included in said unit for converting said long duration pulses corresponding to pulses from said second detector into second composite pulses each having a first portion of a duration approximately equal to that of the long duration pulse followed by a second portion of opposite polarity having an area approximately equal to the area of said first portion thereof, means for transmitting said first and second composite pulses over the same conductor of said cable to the earth's surface as oppositely polarized composite pulses, pulse amplifier means connected to said conductor at the earth's surface and arranged to amplify both said first and second composite pulses, a pair of parallel connected oppositely polarized diodes, a pulse integrator comprising a high gain amplifier and a capacitative feedback circuit connected between the output and input of said high gain amplifier, means connecting one side of said parallel connected diodes to the input of said high gain amplifier, means connecting the output of said pulse amplifier means to the other side of said parallel connected diodes, whereby noise impulses which are of an amplitude less than the conduction potential of said diodes are not transmitted to the input of said high gain amplifier, means for varying the potential at said other side of said parallel connected diodes, whereby the clipping level of said diodes can be varied to adjust the relative areas of said first and second portions of said composite pulses, said integrator circuit having a time constant such that each of said composite pulses is converted into a unidirectional pulse having substantially no overshoot portion of the opposite polarity, said unidirectional pulses corresponding to one of said detectors being of the opposite polarity from those unidirectional pulses corresponding to the other of said detectors, and a work circuit connected to the output of said high gain amplifier.

16. In a well logging system, a subsurface unit, a cable for moving said unit within a bore hole, first and second detectors in said unit and each arranged to produce a pulse type signal, means included in said subsurface unit for developing pulses of relatively long duration in response to pulses produced by said first and second detectors, means included in said unit for converting said long duration pulses corresponding to pulses from said first detector into first composite pulses each having a first portion of a duration approximately equal to that of the long duration pulse followed by a second portion of opposite polarity having an area approximately equal to the area of said first portion, means included in said unit for converting said long duration pulses corresponding to pulses from said second detector into second composite pulses each having a first portion of a duration approximately equal to that of the long duration pulse followed by a second portion of opposite polarity having an area approximately equal to the area of said first portion thereof, means for transmitting said first and second composite pulses over the same conductor of said cable to the earth's surface as oppositely polarized composite pulses, pulse amplifier means connected to said conductor at the earth's surface and arranged to amplify both said first and second composite pulses, a pair of parallel connected oppositely polarized diodes, a pulse integrator comprising a high gain amplifier and a capacitative feedback circuit connected between the output and input of said high gain amplifier, means connecting one side of said parallel connected diodes to the input of said high gain amplifier, means connecting the output of said pulse amplifier means to the other side of said parallel connected diodes, whereby noise impulses which are of an amplitude less than the conduction potential of said diodes are not transmitted to the input of said high gain amplifier, means for varying the potential at said other side of said parallel connected diodes, whereby the clipping level of said diodes can be varied to adjust the relative areas of said first and second portions of said composite pulses, said integrator circuit having a time constant such that each of said composite pulses is converted into a unidirectional pulse having substantially no overshoot portion of the opposite polarity, said unidirectional pulses corresponding to one of said detectors being of the opposite polarity from those unidirectional pulses corresponding to the other of said detectors, means including a capacitor connected to said other side of said parallel connected diodes for suppressing undesired overshoot portions of said oppositely polarized unidirectional pulses, and a work circuit connected to the output of said high gain amplifier.

References Cited by the Examiner
UNITED STATES PATENTS

| | | | |
|---|---|---|---|
| 2,942,112 | 6/1960 | Hearn | 340—18 X |
| 3,223,968 | 12/1965 | DeShazo | 340—18 |
| 3,270,316 | 8/1966 | Walker et al. | 340—-18 |

R. M. SKOLNIK, *Assistant Examiner.*

BENJAMIN A. BORCHELT, *Primary Examiner.*